Aug. 8, 1950 R. L. KEELER 2,518,238
WEEDLESS FISH BAIT
Filed Dec. 5, 1946 2 Sheets-Sheet 1
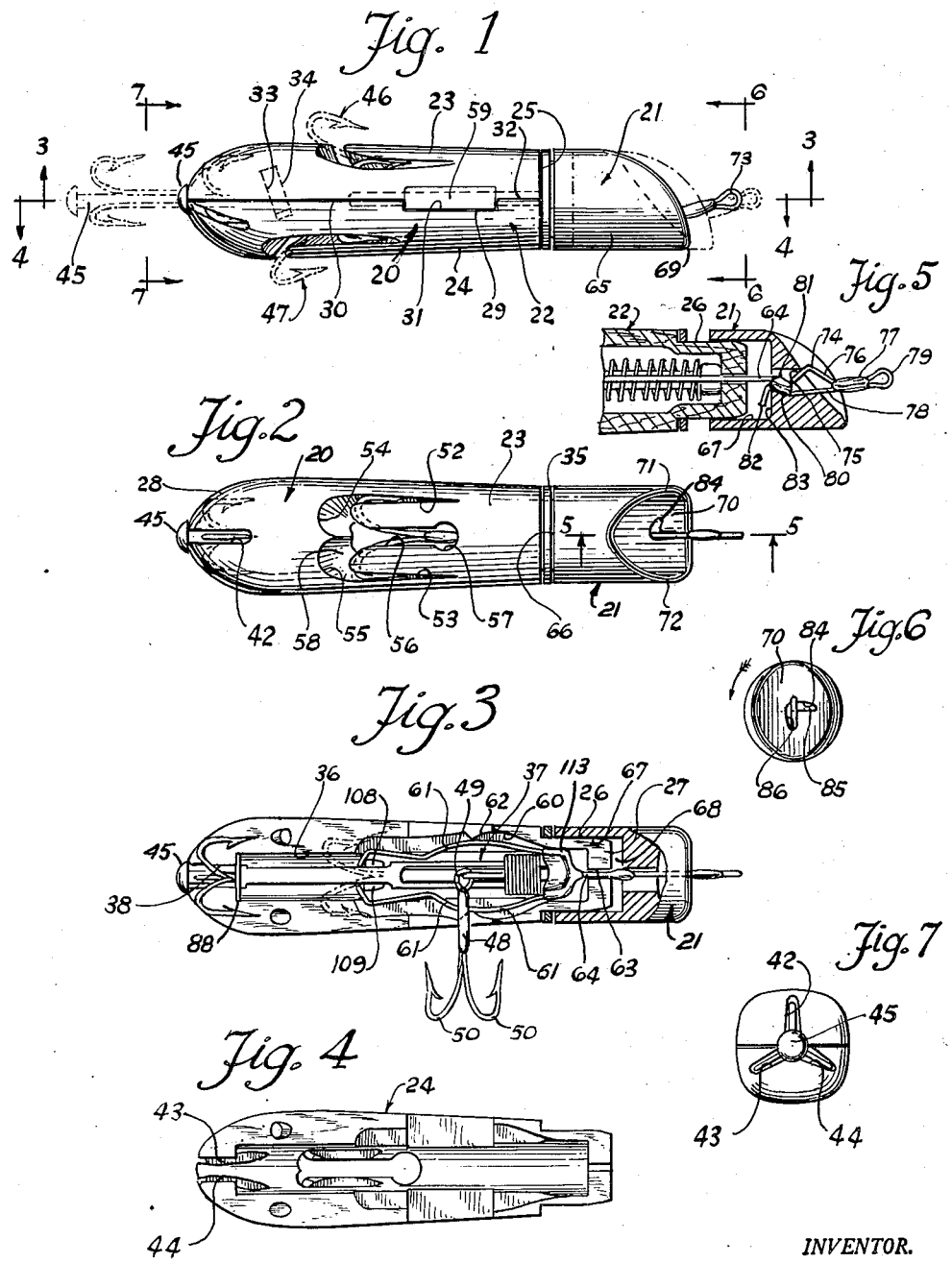
INVENTOR.
Robert Lewis Keeler
BY Robert H Wendt
his attorney

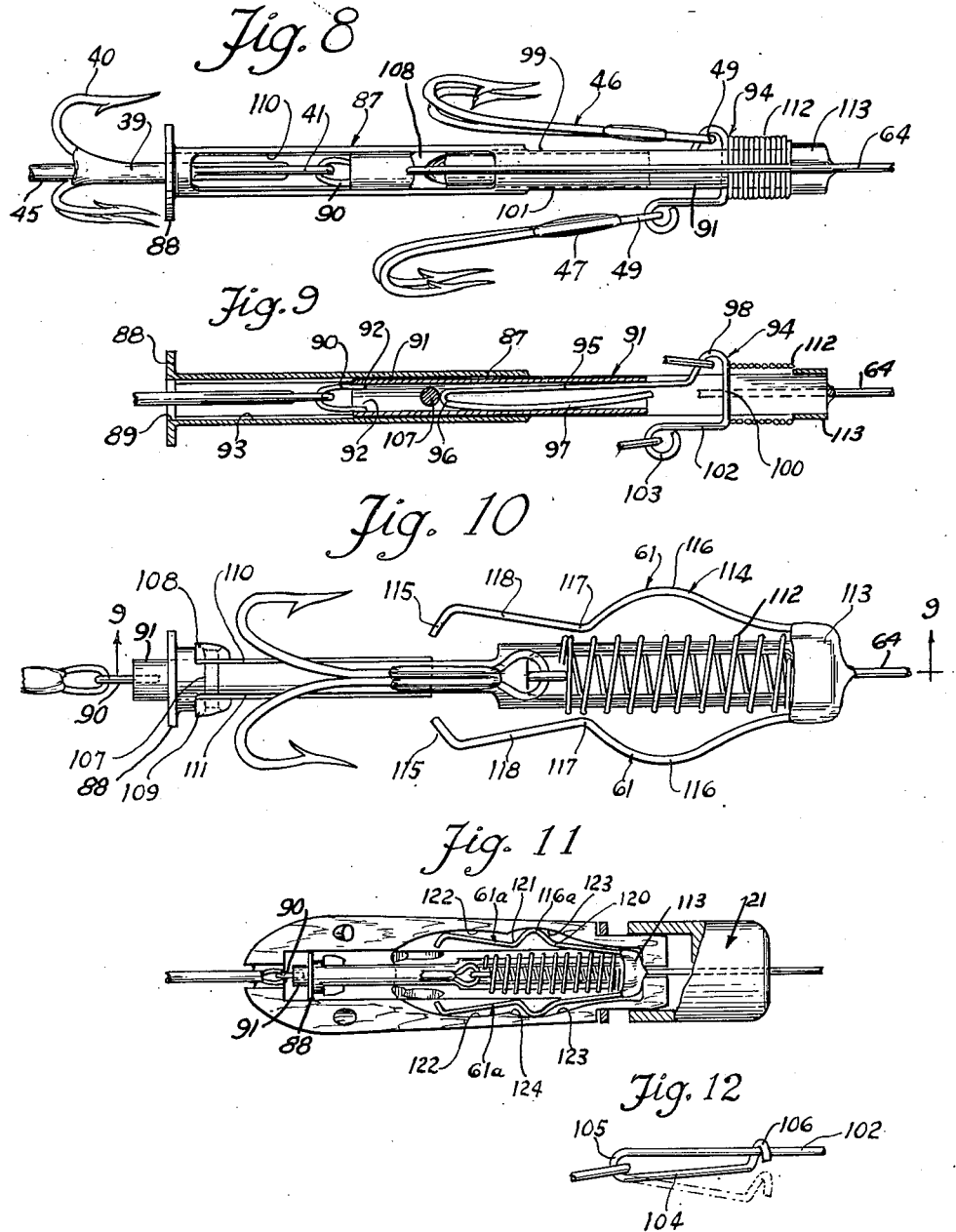

Patented Aug. 8, 1950

2,518,238

UNITED STATES PATENT OFFICE 2,518,238

WEEDLESS FISH BAIT

Robert L. Keeler, Chicago, Ill.

Application December 5, 1946, Serial No. 714,171

12 Claims. (Cl. 43—39)

The present invention relates to weedless fish bait, and is particularly concerned with the provision of an improved bait of the plug type, which is provided with a plurality of hooks which are adapted to be concealed or embedded in the body of the plug until the fish has struck the plug and impeded the forward progress of the bait, upon which occurrence the hooks are released and urged outward into engagement with the mouth of the fish.

One of the objects of the invention is the provision of an improved bait of the class described, which is provided with a movable head adapted to control the latches which hold the hooks in their recesses, and which, though sensitive to a drag placed upon the body of the bait by the fish, is not affected by engagement with weeds or other obstacles at the head of the bait.

Another object of the invention is the provision of an improved bait of the class described which is provided with a type of head which is removable, but adapted to be firmly locked in position by means of a rotative movement, so that interchangeable heads may be employed on the same plug, such as different weight heads or different designs. For example, one type of head may be used for a top water bait, another for under water, and a third for a splashing type bait. Different colors may also be used.

Another object of the invention is the provision of an improved plug having a multiplicity of latch-controlled hooks located in recesses so that the hooks will not catch on the weeds, but, immediately upon the grasping of the plug body by a fish, the latches controlling the hooks will be released, and the hooks, which have been practically invisible up to this time, will be forced outward into position to engage the mouth of the fish and to assure its capture.

Another object of the invention is the provision of an improved plug of the class described which may be provided with interchangeable bodies so that a user who purchases one of the forms of the mechanism may have a multiplicity of plug bodies of different colors and designs, and so that the device is adaptable to make plugs of any of the types which are now on the market.

Another object of the invention is the provision of an improved plug of the class described which utilizes standard type hooks, or standard types which may be made from the commercial hooks by a simple modification, and in which there are hooks on top as well as on the bottom and on the rear end of the plug.

Another object of the invention is the provision of an improved plug construction including improved means for holding the parts of the plug together in assembly with the latching and hook-supporting mechanism.

Another object of the invention is the provision of an improved hook-supporting mechanism in a device of the class described which may easily be taken apart so that it may be cleaned and oiled; and so that if a hook breaks, it can readily be removed and replaced with another hook.

Another object of the invention is the provision of an improved bait of the class described which is very sensitive when it is struck by a fish, but which is not set off by weeds or other objects which hit the front of the plug, and in which the head cannot be lost, as it is threaded on the shank which is attached to the line and located above the main body.

Another object of the invention is the provision of an employed head construction for a bait of the class described which may also be employed upon ordinary plugs to provide baits of different characteristics, different weights, and different designs, such as for top water, under water, and splashing action.

Another object of the invention is the provision of an improved bait of the class described which is simple, sturdy, adapted to be used for a long period of time without necessity for repair or replacement of its parts, and which may be manufactured at a low cost.

Other objects and advantages of the invention will be apparent from the following description and the accompanying drawings, in which similar characters of reference indicate similar parts throughout the several views.

Referring to the two sheets of drawings,

Fig. 1 is a side elevational view of the plug with the hooks shown in full lines in their latched or recessed position and in dotted lines as they appear when they have been released by a fish striking the bait.

Fig. 2 is a top plan view with the hooks in latched position.

Fig. 3 is a sectional view taken on the plane of the line 3—3 of Fig. 1, looking in the direction of the arrows.

Fig. 4 is a sectional view taken on the plane of the line 4—4 of Fig. 1, looking in the direction of the arrows, showing one half of the plug with the mechanism removed.

Fig. 5 is a fragmentary sectional view taken on the plane of the line 5—5 of Fig. 2, looking in the direction of the arrows.

Fig. 6 is an end elevational view of the head taken on the plane of the line 6—6 of Fig. 1, looking in the direction of the arrows.

Fig. 7 is an end elevational view of the body of the plug taken on the plane of the line 7—7 of Fig. 1, looking in the direction of the arrows.

Fig. 8 is an enlarged view of the hooks and hook-supporting mechanism shown apart from the plug body in the latched position.

Fig. 9 is a fragmentary axial sectional view taken on the plane of the line 9—9 of Fig. 10, looking in the direction of the arrows, showing the details of structure of the hook-supporting plunger.

Fig. 10 is a fragmentary view similar to Fig. 8, with the mechanism in the expanded or non-latched position.

Fig. 11 is a view similar to Fig. 3, showing a modified form of latching mechanism for holding the hooks in their recesses.

Fig. 12 is a fragmentary elevational view of a modified form of connection between the hooks and the supporting plunger.

The plugs embodying the present invention are indicated in their entirety by the numeral 20, and preferably include a removable head 21 and a body 22, which may consist of a pair of half bodies 23, 24. The two half bodies 23, 24 are each provided with external, partially cylindrical surfaces, the plug tapering slightly toward the front end, where it is provided with an annular shoulder 25 and a reduced cylindrical portion 26 which has a flat end 27. Other shapes and designs may also be used.

The body 22 of the plug is provided with a blunt, oval end formation 28 at its trailing end, and in order to hold the two halves of the plug in alignment, one of the halves 23 may be provided with a transverse rib 29 on its flat side 30, which is complementary to a transverse groove 31 located on the flat side 32 of the other half 24. The rib 29 and groove 31 are preferably substantially rectangular in side elevation, but the rib may have a slight taper.

Adjacent the trailing end, the two halves 23 and 24 are provided with the diagonally extending transverse bores 33 for receiving the pins 34, which are in the nature of a dowel, to maintain the alignment of the halves of the plug at this end, and, due to the diagonal direction of the pins 34, the pins also hold the halves of the plug together when the rib 29 is in the groove 31. With such an arrangement it is only necessary to provide a ring 35 having a bore of sufficient size to fit on the reduced cylindrical portion 26 for holding this end of the two halves of the plug together.

The pins 34 and ring 35 may be made of light metal or a light-weight plastic. The pins 34 are preferably cylindrical, while the ring 35 is preferably rectangular in cross-section and arranged with its outer surface flush with the outer surface of the plug body 22.

Each of the half bodies 23, 24 is formed with a half cylindrical, centrally located groove forming a bore 36 when the two halves of the body are assembled. The bore 36 is adapted to receive the hook-supporting and latching mechanism which is indicated in its entirety by the numeral 37.

The body halves are also provided with grooves at the trailing end which form an aperture 38 large enough to house the common central shank 39 of the trailing hook assembly 40, which, preferably, includes a plurality of hooks, such as three. This hook assembly may be made by soldering together three hooks in equi-angular spaced relation at their lower ends, all having a common shank 39 and a single eye 41.

The body is also provided with grooves or recesses for housing the pointed ends of the hook assembly 40, these grooves or recesses being equally spaced in an angular relation so that the upper half 23, Fig. 2, may have one centrally located groove 42, while the lower half 24, Fig. 4, may have a pair of equally spaced grooves 43, 44. The shape of these grooves varies, according to the shape of the hooks, but, in general, the grooves are axially and radially extending slots of sufficient width to receive and completely house the three hooks.

The size of the body 22 of the plug is such that when the hooks are in the latched position, the outer surface of the body extends outwardly beyond the pronged ends of the hooks at the point where the hooks are then located, and also preferably houses all parts of the hooks except an axially extended headed handle 45, Fig. 1, which preferably forms a part of the hook assembly 40 and is soldered to the shank 39 and extends axially therefrom beyond the hooks.

The handle 45 may be grasped with the thumb and forefinger in manipulating the hooks, and may also be used to press against a solid object in driving the hooks inward to the latched position.

The upper and lower hook assemblies 46, 47, Fig. 1, preferably consist of a pair of hooks formed with a common shank 48 in each case and a common eye 49, which support the two oppositely extending hooks 50, 51. The hook portions 50, 51 preferably extend at an obtuse angle to each other so that each body half may be provided with the slots 52, 53 for receiving and housing the barbed end of these hooks, these slots being provided with an inwardly curved and widened portion at 54 and 55 joining with a central slot 56 to receive the shank 48. The central slot 56 may end in a partially circular aperture 57 which is useful for passing the eye 49 of the hook assembly when hooks are to be inserted or changed.

At the enlarged portions 54, 55 of these grooves the wall of the groove has an inwardly sloping surface 58 which tends to cam the two hook formations 50, 51 inward as they are pulled in an axial direction by the latching mechanism. The same camming surfaces 58 serve to guide the hook portions 50, 51 outward when the hooks are released, and when the mechanism moves them toward the trailing end of the plug, so that these upper and lower hooks are radially ejected to the dotted line positions shown in Fig. 1, when the latching mechanism releases them.

The rib formations 29 on the upper half 22, Fig. 1, are preferably in the form of plastic inserts which may be rectangular in elevation, as shown and indicated at 59, Fig. 1, in the case of a plug which is made of wood. These parts are made of plastic, because on the inside of the plug the parts 59 are formed with the curved grooves 60 for housing the latching arms 61, and with the ridge 62, which engages these arms and holds them in the latched position.

In the case of a wooden plug, the use of such a plastic insert is desirable to prevent wear of these parts, but if the plug is made of metal or plastic, it would not be necessary to use inserts.

At the leading end of the body 22 the two plug halves are again formed with relatively narrow axial grooves 63 which form an aperture when the halves are assembled to pass the shank 64 of the latching mechanism.

The head 21 may be made of wood, plastic, or light metals, and it is preferably made removable so that different designs and weights of heads may be used on the same body.

The present plug may be embodied in various shapes, the one which has been selected to illustrate the invention being of the basserino type, but the same construction may be used for all of the different types of plugs on the market, such as jitterbug heads, spinner heads, deep water baits, or different color variations.

The head illustrated may be used upon ordinary plugs, as well as on the present plug. It is preferably provided with a substantially cylindrical body 65 which terminates in a flat end 66 adjacent the ring 35. The cylindrical body portion 65 has an axial bore 67 of sufficient size to have a freely sliding fit on the reduced cylindrical portion 26 of the plug body 22. The bore 67 is of sufficient length to house the reduced cylindrical portion 26 and to have a clearance 68 at the end of this cylindrical portion 26 so as to give sufficient room to assure a range of movement which is needed to latch the hooks.

At its leading end the head 21 is made longer toward its bottom forward edge 69, and its leading face is provided with a partially cylindrical depression 70 formed on the axis of a cylinder which extends diagonally upward and backward. This leaves a pair of upwardly and backwardly curved ridges 71 and 72 on the sides of the cylindrical depression 70, and the tendency of such a forward face is to cause the plug to dig into the water and to travel beneath the surface of the water.

It is also a characteristic of such plugs that they wobble as they move forward in the water, this probably being due to the fact that they are attached to a flexible line which permits such action, and the wobbling action is the same in nature as that which takes place when a boat is towed with a long tow rope.

Another factor in the action of the head 21 lies in the fact that the shank of the hook-supporting mechanism is located above center at the eye 73, which is bent upward slightly to locate it above center, so that the pull is above center, and the point 69 of the head tends to dig downwardly in the water.

The removable head 21 may determine the characteristics of the bait by virtue of its shape, design and weight, and different heads may be employed upon the same plug. In addition to this, however, the head 21 is adapted to control the latching mechanism, and for this purpose it is arranged to be removably but fixedly secured on the shank 64 of the latching mechanism. For this purpose the shank 64, Fig. 5, is provided with a hump 74 which may extend upwardly in Fig. 5, and which forms a shoulder 75 engaging on the outside of the head 21 to secure the head to the shank 64.

From the hump 74, the wire of which the shank 64 is made may extend diagonally downward at 76, and may be provided with a portion 77 which is parallel to a lower portion 78 to which it is soldered. The wire is backwardly bent at 79, forming a loop or eye for attachment to the line, and the straight, backwardly extending portion 78 may be bent diagonally upward at 80 and soldered to a parallel portion 81. Thereafter, the end 82 of the portion 80 is bent transversely or downward, and it is adapted to engage the end wall 83 of the bore 67 in the head to hold the head on the shank 64 against movement toward the left in Fig. 5.

Thus it will be observed that the head 21 is engaged on the inside by the wire portion 82 and on the outside by the wire portion 75 in Fig. 5, and thus the head 21 is secured rigidly on shank 64, for movement in an axial direction with the shank 64. The head may be used as an actuating member when the user is manually setting the latch.

The assembly comprising the shank 64 and eye 79 extends outwardly of the head 21 through an aperture 84, and this aperture is preferably angular in form, that is, it has two portions 85, 86 extending transversely to each other. Both the portions 85, 86 of the angular aperture 84 are of the same width, that is, they are wide enough to pass the eye 79 and other parts of the wire forming this assembly; but they are not of the same length.

The portion 86 of this angular aperture is not deep enough to pass the hump 74, while the portion 85 of this angular aperture 84 is large enough to pass the hump 74. Thus the eye 79 may be passed through the portion 85 of the aperture 84, and the axial motion of the head 21 on the body 22 may continue until the hump 74 passes to the outside of the head 21 through the same slot 85. Then the head 21 may be rotated ninety degrees on the shank 64, and the hump 74 and adjacent portions will pass over into the slot portion 86 which is not as deep as the slot portion 85.

The purpose of the angular aperture 84, formed with two slots 85, 86 of different length, is to permit the head to be placed over the shank so that the head will be thereafter retained on the shank if it is rotated 90 degrees. Thus the slot 84 is long enough to pass the hump 74 on the shank, but when the head is turned 90 degrees the hump 74 engages outside the slot 86, which is too short to pass the hump.

The walls of the slot portion 86 engage behind the hump 74 at the diagonal surface 75, Fig. 5, while the end portion 82 of the wire strikes the inside end wall 83 of the bore 67 in the plug. The plug is then fixedly secured to the shank. It may be caused to slide on the reduced cylindrical portion 26 of the plug body 22, and in so sliding it may cause the shank 64 to move axially in such manner as to control the latching mechanism.

It will thus be observed that the head 21 can be fixedly secured on the shaft 64 in such manner as to act as a handle or actuating knob.

The hook-supporting mechanism preferably comprises a tubular body 87, Fig. 9, serving as a guide for the hook-supporting members. At its trailing end the tubular body 87 may be provided with a radially extending disk 88 having an aperture 89 which registers with the end of the tube 87. The disk 88 may engage the end of the bore 36 in the plug 22 when the hooks are latched.

The trailing hook assembly 40 carried by shank 39 may have its eye 41 secured by means of a U-shaped wire or eye 90 to a second tube or plunger 91 by soldering at 92. The aperture 89 and bore 93 in guide tube 87 are large enough to pass the eye 41 of the trailing hook assembly so that when the hook assembly 40 is to have its prongs recessed, the eye 41 is moved inward to the position of Fig. 8, where it is latched. The other two hook assemblies 46 and 47 have their eyes 49 secured to a wire member 94, which may have an elongated shank 95 bent back on itself at 96 and is provided with another leg 97 which is frictionally secured in the inner tube 91.

Outwardly of the right end of tube 91, Fig. 9, the wire member 94 is bent outwardly to form a loop at 98 which receives the eye of the upper hook assembly 46. This loop 98 projects outwardly from the larger tube 87 through an elongated slot 99. The wire member 94 then passes transversely of the tubes at 100 and extends out of a similar slot 101 on the opposite side of the larger tube 87.

Wire member 94 then has a backwardly turned portion 102 which is formed with an eye 103 for receiving the eye 49 of the lower hook assembly 47. Thus the inner tube 91 has eye members 90, 98 and 103 for supporting all of the hooks.

The eye member 90 can be retracted into the outer tube 87 while the eye members 98 and 103 project outwardly from slots in the outer tube 87. When a hook breaks, the entire assembly may be taken apart and a new hook inserted in the eye formations 98 or 103, by opening the eye 103.

Referring to Fig. 12, this shows an alternative form of eye to be used at the point 103, which is indicated by the numeral 104. In this case, the straight portion 102 is bent back on itself at 105, and the backwardly extending eye portion 104 is formed with a transverse hook 106 which is spring-pressed to the dotted-line position of Fig. 12, but which is hooked on the straight portion 102 to form the eye 104. This alternative eye construction makes it easier to remove and replace hooks.

The inner tube 91 is preferably provided with a transverse screw bolt 107, Fig. 9, the head 108, Fig. 3, and nut 109, which may serve as latching shoulders carried by the inner tube 91. The outer tube 87 is provided with another pair of slots 110, 111, Fig. 8, Fig. 10, located in the sides of the tube 87, as distinguished from the slots 99, 101, Fig. 8, which are located in the top and bottom of tube 87. The slots 110, 111 serve to pass the bolt head 108 and nut 109.

It should be understood that a threaded bolt with two nuts may be employed, if desired, and in some embodiments this may be a riveted stud, but it is preferred to have a threaded member at this point so that the entire device can be taken apart for cleaning and oiling at the end of the season.

The transversely extending portion 100 of the hook-supporting wire member 94 projects far enough from the larger tube 87 at the slots 99, 101, Fig. 8, Fig. 9, to engage the end of a helical coil spring 112. This coil spring surrounds the larger tube 87 with which it has a clearance, so that it may expand freely, and the other end of the coil spring 112 may be inwardly turned through the slot 99 or 101 to engage a cap 113 which is soldered to the end of the tube 87. The cap 113 is also soldered to the shank 64 which carries the eye 79, Fig. 5, the shank 64 being centrally located in the cap 113.

The cap 113 also supports a latching spring assembly 114, which may consist of a pair of separate arms 61, 61, or a single U-shaped member having two legs of the shape shown. At their trailing ends the arms 61 have inwardly extending latching portions 115 which extend transversely to the heads or nuts 108, 109 with which they are intended to engage to latch the hooks in the concealed position.

The transverse latching portions 115 may extend slightly diagonally toward the rear or left in Fig. 10 so as to facilitate the unlatching of the hooks when the bait is grasped by a fish. The heads or nuts 108, 109, which serve as a keeper for the plunger or internal tube 91, tend to cam the latching portions 115 apart.

The latching arms 61 may each bend outwardly from the cap 113 to form a pair of curved humps 116, after which the latching arms 61 preferably extend inwardly to the points 117, from whence they extend diagonally outward to provide sufficient room for the inwardly extending latching end portions 115.

The arms 61 are initially biased outward away from the latching position, and need to be pressed together to secure the latch, but this is done by so moving the shank 64 and cap 113, and with it the arms 61, that the arms pass from the outwardly curved portion 60 of the insert 59 over the hump 62, which tends to press them together, as shown in Fig. 3, to engage the ends 115 behind the nuts 108, 109. There the arms 61 are held by the engagement of the humps 116 with the hump 62, but it requires very little force applied to the body 22 of the plug to pull the plug rearwardly with respect to the line, head 21, and shank 64, which would slide the arms 61 to the right in Fig. 3 until their humps 116 are housed in the curved recesses 60.

The arms 61 tend to spring outwardly during the course of this movement, and the latching nuts 108, 109 tend to push the arms 61 outwardly as they are urged to the left by the spring 112, and, therefore, the latching mechanism is very sensitive, and easily touched off by anything which retards the forward progress of the body 22 with respect to the head 21 or the line which supports the eye 73.

The head 21, however, is fixedly secured on the shank 64, and any weeds or other obstacles which engage the forward surfaces of the head 21 do not tend to unlatch the hooks. The hooks are practically invisible in the body and cannot catch on any weeds or other obstacles, and it is only after the fish has struck the body, and grasped it in its mouth, that the very slight pull which is placed upon the body by the fish unlatches the hooks, which spring into position to engage the mouth of the fish on all sides.

Referring to Fig. 11, this is a modification in which the two arms 61a perform the same function, but they are of slightly different shape, being provided intermediate their length with a more abrupt hump 116a In this case, each arm is bent outward at 120, backward at the hump 116a, and again outward at 121. It will be seen that the hump 116a is more abrupt than the hump 116 of Fig. 3. Also, the insert which engages the humps 116a is formed with a pair of curved surfaces 122, 123, which are formed on the radius of a relatively large circle, and which join at a point at 124.

When the device of Fig. 11 is latched, the hump 116a rests upon the point 124 and is in a relatively unstable condition, from which it may be very easily unlatched. This tends to increase the sensitivity of the device, but the operation is substantially the same as previously described.

The mode of latching the device and of moving the hooks into recessed position is as follows: The upper and lower hook assemblies 46, 47 should be engaged by the thumb and forefinger, which hold the plug, and should be placed so that axial movement will guide them down the sloping surfaces 58 into the grooves 52, 53, with the shank passing down the groove 56. With these hook assemblies in proper position, the user may grasp the headed handle 45 at the end of the trailing hook assembly 40, and the three hooks should be rotated until they are in alignment with their grooves 42, 43, 44. Then pressure should be exerted upon the handle 45 toward the right with respect to the body 22, Fig. 1, until all of the hooks are pushed or drawn into their recesses, and are wholly housed in the plug 22.

As the handle 45 is pushed inwardly, the shank 39 of the trailing hook assembly 40 will drive the inner tube 91 to the right in Figs. 8 and 9, until the latching nuts 108, 109 pass to the right from the position of Fig. 10 to that of Fig. 3. When the hooks are fully enclosed in their grooves, the nuts 108, 109 are in position to be engaged by the latching arms 61a. While the plug and hooks are so held, the operator should then push the head 21 toward the left in Fig. 11 to move it to the position of Fig. 3. This will cause the camming shoulders 62 to press the arms 61 together, making the latching ends 115 of these arms engage behind the nuts 108, 109 which act as keepers.

The arms 61 thus retain the hooks in the latched position, but they may be unlatched by merely moving the head toward the right with respect to the head 21, or by moving the body to the left with respect to the head. The latter is what takes place when the fish strikes the body of the plug and impedes its forward progress, which is caused by means of the line.

It will thus be observed that I have invented an improved weedless fish bait which may be embodied in any of the standard types or designs of bait. The mechanism is adaptable to any plug now on the market, and the head may be used with ordinary plugs to adapt them to provide top water, under water, or splashing bait, or to change their design or appearance.

The present device may be provided with interchangeable bodies so that with one mechanism a user may have many different baits or colors of bodies. The hooks carried by the present weedless bait are practically invisible, and are housed and concealed inside the plug until the forward movement of the plug is impeded by the strike of a fish, upon which all of the hooks spring out, and since there are hooks on both top and bottom, and a trailing hook assembly, there is a practical certainty that some of these hooks will engage the mouth of the fish.

The present device uses a standard type of hook, which may be modified and assembled, and it is capable of being taken completely apart for cleaning and oiling at the end of the season, or if a hook breaks, it may be readily removed and replaced. The head cannot be lost, as the shank passes through it and is attached to a line, and weeds or other objects hitting the front of the plug do not set off the latch. The mechanism is simple, sturdy, and adapted to be used for a long period of time without necessity for repair or replacement.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a latching mechanism for hooks, the combination of a tubular support having a longitudinal slot, with a smaller tubular plunger slidably mounted in said support, said latter tubular plunger having a keeper projecting laterally through said slot from said tubular support, a latching member carried by said tubular support adapted to engage said keeper, means for forcing said latching member into engagement with the keeper to latch the sliding tubular plunger in retracted position, and a plurality of hooks carried by said sliding tubular plunger.

2. In a latching mechanism for hooks, the combination of a tubular support having a longitudinal slot, with a smaller tubular plunger slidably mounted in said support, said tubular plunger having a keeper projecting laterally through said slot from said tubular support, a latching member carried by said tubular support adapted to engage said keeper, means for forcing said latching member into engagement with the keeper to latch the slidable tubular plunger in retracted position, a plurality of hooks carried by said slidable tubular plunger, and resilient means carried by said tubular support and reacting against said slidable tubular plunger to urge the hooks into extended position.

3. In a latching mechanism for hooks, the combination of a tubular support having a longitudinal slot, with a smaller tubular plunger slidably mounted in said support, said latter tubular plunger having a keeper projecting laterally through said slot from said tubular support, a latching member carried by said tubular support adapted to engage said keeper, means for forcing said latching member into engagement with the keeper to latch the slidable tubular plunger in retracted position, a plurality of hooks carried by said slidable tubular plunger, and resilient means carried by said tubular support and reacting against said slidable tubular plunger to urge the hooks into extended position, a housing having recesses for receiving said hooks, said mechanism being mounted in said housing, whereby the hooks may be latched in substantially concealed and housed condition, to be released upon release of said keeper by said latching means.

4. In a latching mechanism for hooks, the combination of a tubular support having a longitudinal slot, with a smaller tubular plunger slidably mounted in said support, said latter tubular plunger having a keeper projecting laterally through said slot from said tubular support, a latching member carried by said tubular support adapted to engage said keeper, means for forcing said latching member into engagement with the keeper to latch the slidable tubular plunger in retracted position, a plurality of hooks carried by said slidable tubular plunger, and resilient means carried by said tubular support and reacting against said slidable tubular plunger to urge the hooks into extended position, a housing having recesses for receiving said hooks, said mechanism being mounted in said housing, whereby the hooks may be latched in substantially concealed and housed condition, to be released upon release of said keeper by said latching means, and a shank carrying said tubular support and having means for attachment to a line.

5. In a latching mechanism for hooks, the combination of a tubular support having a longitudinal slot, with a smaller tubular plunger slidably mounted in said support, said latter tubular plunger having a keeper projecting laterally through said slot from said tubular support, a latching member carried by said tubular support adapted to engage said keeper, means for forcing said latching member into engagement with the keeper to latch the slidable tubular plunger in retracted position, a plurality of hooks carried by said slidable tubular plunger, and resilient means carried by said tubular support and reacting against said slidable tubular plunger to urge the hooks into extended position, a housing having recesses for receiving said hooks, said mechanism being mounted in said housing, whereby the hooks may be latched in substantially concealed and housed condition, to be released upon release of said keeper by said latching means, and a shank carrying said tubular support and having means for attachment to a line, and said mechanism being slidable in said housing, said housing having a camming formation for actuating said latching means into latched position upon sliding of the mechanism by the shank in the housing.

6. In a latching mechanism for fish hooks or the like, the combination of a tubular supporting body, said body having a pair of longitudinally extending slots, a second tubular member sliding in said body, said second tubular member supporting at its lower end the shank of a multiple fish hook which projects from the end of said body, a compression coil spring carried by said body and having one end attached to said body and the other end engaging in said second tubular sliding member, said coil spring having attached to its free end a pair of double fish hooks, said double fish hooks projecting longitudinally of said body and being pivotally mounted to spread from said body, and latching means carried by said body for holding the body telescoped over said sliding tubular member with said hooks retracted and said spring compressed, the hooks to be projected upon release of said spring by said latching means.

7. In a latching mechanism for fish hooks or the like, the combination of a tubular supporting body, said body having a pair of longitudinally extending slots, a second tubular member sliding in said body, said second tubular member supporting at its lower end the shank of a multiple fish hook which projects from the end of said body, a compression coil spring carried by said body anad having one end attached to said body and the other end engaging in said second tubular sliding member, said coil spring having attached to its free end a pair of double fish hooks, said double fish hooks projecting longitudinally of said body and being pivotally mounted to spread from said body, latching means carried by said body for holding the body telescoped over said sliding tubular member with said hooks retracted and said spring compressed, the hooks to be projected upon release of said spring by said latching means, and a housing surrounding said spring and body and provided with through apertures for substantially receiving the said hooks when they are in retracted position.

8. In a latching mechanism for fish hooks or the like, the combination of a tubular supporting body, said body having a pair of longitudinally extending slots, a second tubular member sliding in said body, said second tubular member supporting at its lower end the shank of a multiple fish hook which projects from the end of said body, a compression coil spring carried by said body and having one end attached to said body and the other end engaging in said second tubular sliding member, said coil spring having attached to its free end a pair of double fish hooks, said double fish hooks projecting longitudinally of said body and being pivotally mounted to spread from said body, latching means carried by said body for holding the body telescoped over said sliding tubular member with said hooks retracted and said spring compressed, the hooks to be projected upon release of said spring by said latching means, and a housing surrounding said spring and body and provided with through apertures for substantially receiving the said hooks when they are in retracted position, the said body being provided with a shank for attachment to a line, said shank projecting out of one end of said body, and said latching means comprising a keeper on said body and a resilient engaging member carried by said tubular sliding member for engaging said keeper.

9. In a latching mechanism for fish hooks or the like, the combination of a tubular supporting body, said body having a pair of longitudinally extending slots, a second tubular member sliding in said body, said second tubular member supporting at its lower end the shank of a multiple fish hook which projects from the end of said body, a compression coil spring carried by said body and having one end attached to said body and the other end engaging in said second tubular sliding member, said coil spring having attached to its free end a pair of double fish hooks, said double fish hooks projecting longitudinally of said body and being pivotally mounted to spread from said body, latching means carried by said body for holding the body telescoped over said sliding tubular member with said hooks retracted and said spring compressed, the hooks to be projected upon release of said spring by said latching means, and a housing surrounding said spring and body and provided with through apertures for substantially receiving the said hooks when they are in retracted position, the said body being provided with a shank for attachment to a line, said shank projecting out of one end of said body, and said latching means comprising a keeper on said body and a resilient engaging member carried by said tubular sliding member for engaging said keeper, the said housing having a camming projection for urging said spring engaging member into engagement with the keeper when the housing is moved in such direction with respect to the hooks as to house the hooks.

10. In a latching mechanism for fish hooks or the like, the combination of a tubular supporting body, said body having a pair of longitudinally extending slots, a second tubular member sliding in said body, said second tubular member supporting at its lower end the shank of a multiple fish hook which projects from the end of said body, a compression coil spring carried by said body and having one end attached to said body and the other end engaging in said second tubular sliding member, said coil spring having attached to its free end a pair of double fish hooks, said double fish hooks projecting longitudinally of said body and being pivotally mounted to spread from said body, and latching means carried by said body for holding the body telescoped over said sliding tubular member with said hooks retracted and said spring compressed, the hooks to be projected upon release of said spring by said latching means, and a housing surrounding said spring and body and provided with through apertures for substantially receiving the said hooks when they are in retracted position, a diagonally extending dowel pin, said housing comprising a pair of half-housing members held together at the hook end thereof by said diagonally extending dowel pin, a cap, and the said housing being held at its opposite end by said cap slidably engaging over said half-housing members.

11. In a latching mechanism for fish hooks or the like, the combination of a tubular supporting body, said body having a pair of longitudinally extending slots, a second tubular member sliding in said body, said second tubular member supporting at its lower end the shank of a multiple fish hook which projects from the end of said body, a compression coil spring carried by said body and having one end attached to said body and the other end engaging in said second tubular sliding member, said coil spring having attached to its free end a pair of double fish hooks, said double fish hooks projecting longitudinally of said body and being pivotally mounted to spread from said body, and latching means carried by said body for holding the body telescoped over said sliding tubular member with said hooks retracted and said spring compressed, the hooks to be projected upon release of said spring by said latching means, and a housing surrounding said spring and body and provided with through apertures for substantially receiving the said hooks when they are in retracted position, a diagonally extending dowel pin, said housing comprising a pair of half-housing members held together at the hook end thereof by said diagonally extending dowel pin, a cap, the said housing being held at its opposite end by said cap slidably engaging over said half-housing members, the said cap being rigidly mounted on said shank so that the housing may slide relative to the shank and cap, and retraction of the housing unlatches the hooks.

12. In a latching mechanism for fish hooks or the like, the combination of a tubular supporting body, said body having a pair of longitudinally extending slots, a second tubular member sliding in said body, said second tubular member supporting at its lower end the shank of a multiple fish hook which projects from the end of said body, a compression coil spring carried by said body and having one end attached to said body and the other end engaging in said second tubular sliding member, said coil spring having attached to its free end a pair of double fish hooks, said double fish hooks projecting longitudinally of said body and being pivotally mounted to spread from said body, and latching means carried by said body for holding the body telescoped over said sliding tubular member with said hooks retracted and said spring compressed, the hooks to be projected upon release of said spring by said latching means, and a housing surrounding said spring and body and provided with through apertures for substantially receiving the said hooks when they are in retracted position, the said apertures in the sides of said housing for said double hooks being formed with camming surfaces engaging the bottoms of the double hooks and causing them to diverge from the body as they are projected through said apertures.

ROBERT L. KEELER.

REFERENCES CITED

The following references are of record in the file of this patent:

UNITED STATES PATENTS

| Number | Name | Date |
| --- | --- | --- |
| 1,009,538 | Lowe | Nov. 21, 1911 |
| 1,217,690 | Berglund | Feb. 27, 1917 |
| 1,345,173 | Halder | June 29, 1920 |
| 2,172,889 | Niemi | Sept. 12, 1939 |
| 2,295,042 | Llewellyn | Sept. 8, 1942 |
| 2,295,292 | Rogers | Sept. 8, 1942 |
| 2,387,255 | Goodlewski | Oct. 23, 1945 |
| 2,424,706 | Pelham | July 29, 1947 |

FOREIGN PATENTS

| Number | Country | Date |
| --- | --- | --- |
| 219,359 | Switzerland | May 16, 1942 |